Jan. 23, 1945. F. H. CLARKSON 2,367,998
CHUCK OR HOLDER
Filed July 16, 1942 2 Sheets-Sheet 1
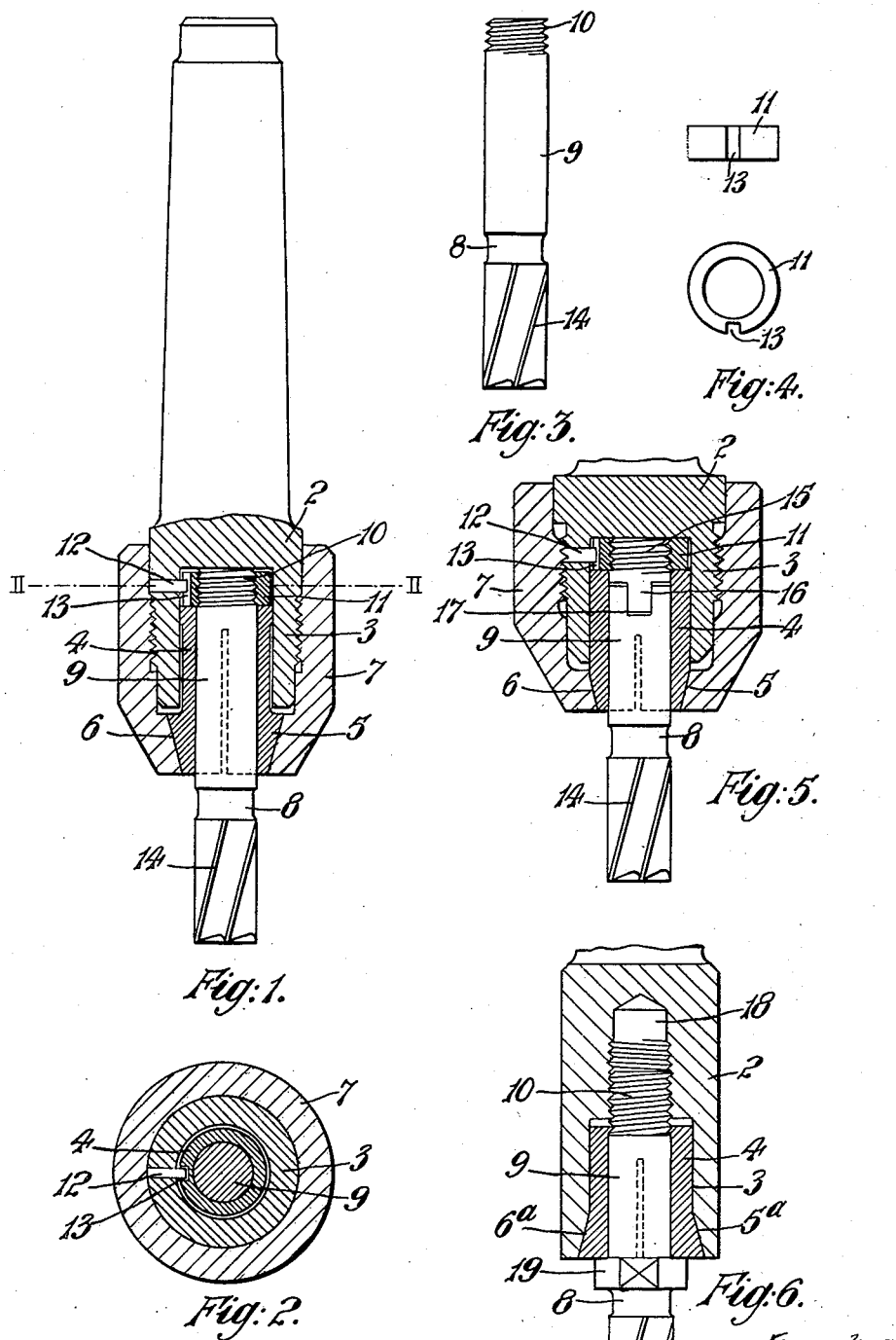

Jan. 23, 1945.  F. H. CLARKSON  2,367,998
CHUCK OR HOLDER
Filed July 16, 1942  2 Sheets-Sheet 2
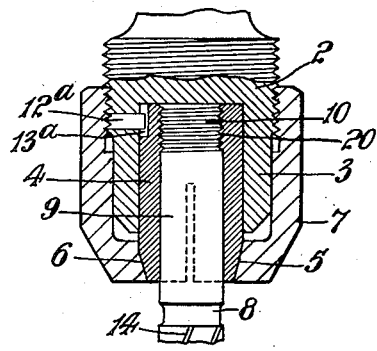
Fig: 7.
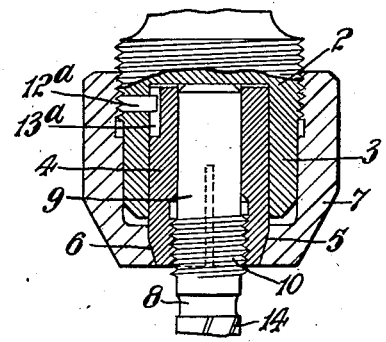
Fig: 8.
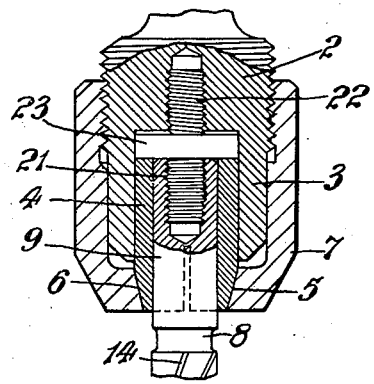
Fig: 9.
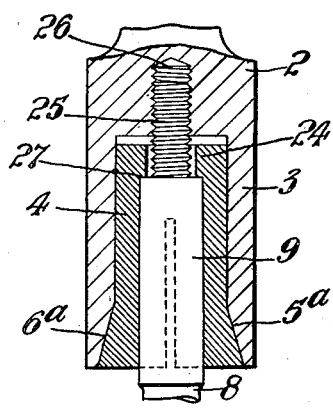
Fig: 10.
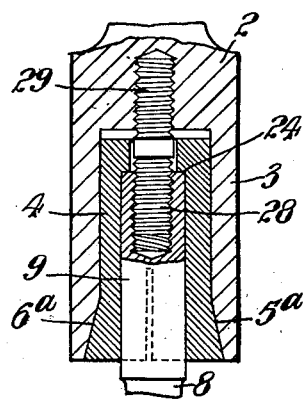
Fig: 11.
Inventor:
Frank H. Clarkson
by Babcock & Babcock
Attorneys Patented Jan. 23, 1945

2,367,998

UNITED STATES PATENT OFFICE 2,367,998

CHUCK OR HOLDER

Frank Henry Clarkson, Coventry, England

Application July 16, 1942, Serial No. 451,200
In Great Britain December 30, 1941

4 Claims. (Cl. 279—53)

This invention relates to milling cutters and the like tools and chucks or holders therefor, of the kind in which the tool is frictionally held in position of use by means of a split collet which is adapted to be contracted around the shank of the tool by the co-action between coned surfaces on the collet and in the chuck body or arbor or in a rotatable locking sleeve screwing onto the socketed end of the latter.

It is known that under heavy duty there is a tendency for slip to take place between the tool and the collet and/or between the collet and the locking sleeve, and that in the case of the end mill type of tool the helix angle of the flutes tends to cause axial movement of the tool.

The present invention takes advantage of these tendencies and consists in utilising the stresses set up thereby to force the coned portion of the collet into closer engagement with its seating in the locking sleeve, or chuck body, as the case may be, thereby increasing the frictional grip of the collet about the tool shank, and to force the end of the latter into closer contact with the blind end of the socket in the chuck body or arbor, thereby counter-acting the opposite tendency produced by the action of the helical flutes.

I am aware that in chucks of the general type herein referred to an arrangement has already been proposed in which a left-hand threaded split sleeve co-operating with a conical nose is automatically tightened onto the article being held as the chuck commences to rotate and the greater the resistance to turning offered by the articles so held the more intense is the grip of the chuck. In this case, however, the effect is obtained by relative rotary motion between the body of the chuck and the split sleeve.

The present invention is distinguished from the arrangement above described in that it does not depend for its automatic action upon relative rotation between the split sleeve or collet and the body of the chuck but upon rotation of the tool relatively to the collet or to the chuck body, the effect in either case being to automatically produce axial pressure on the collet in a direction to increase its frictional grip on the tool, and to counteract any tendency to outward axial movement of the latter.

In the accompanying drawings,

Figure 1 is a view in longitudinal section of a chuck and milling cutter embodying one form of the present nivention.

Figure 2 is a cross-sectional view thereof on the line II—II of Figure 1.

Figure 3 is a detail view of the milling cutter.

Figure 4 includes detail elevation and plan views of the collar.

Figure 5 is a view similar to Figure 1 illustrating a modification.

Figure 6 is a similar view of an alternative construction included within the present invention.

Figures 7-11 each show in vertical section a chuck embodying a further modification.

Throughout the drawings like parts are designated by similar reference characters.

In the accompanying drawings, the invention is shown as applied to a chuck or tool holder of more or less standard type, 2 representing the arbor or chuck body which in use is secured in the driving head of the machine and is formed at its free end with an externally screw-threaded socket 3 adapted to receive a split collet 4 having a conical portion 5 which co-operates with a correspondingly coned portion 6 of a locking sleeve 7 screwing onto the socket. 8 represents the tool, in this case an end mill type of cutter, the shank 9 of which is received in the collet and firmly gripped thereby when the locking sleeve is tightened up.

In the preferred form of the invention shown in Figures 1-4 the end of the cutter shank 9 which enters the collet is screw-threaded at 10 to receive an internally threaded collar 11 which is free to move axially in the socket 3 but is prevented from rotation by means of a pin 12 fixed to the chuck body 2 and engaging an axial groove 13 in the collar. The arrangement is such that when the rotating tool engages the work any rotational slip that may take place between the tool and the collet is immediately arrested by the action of the collar which as the result of such slip is caused, by the screw-threaded end of the tool, to be pressed against the inner end of the collet thereby forcing the coned portion 5 thereof more firmly into engagement with the coned part 6 of the locking sleeve and increasing the frictional grip of the collet about the shank 9 of the tool. At the same time the effect of the re-action produced is to force the inner end of the cutter shank into closer contact with the blind end of the socket 3, thereby arresting any tendency to inward axial movement of the tool due to the action of the helical flutes 14 of the latter.

Instead of forming a screw-thread on the end of the tool shank, precisely the same locking effect as above described can be obtained, as shown in Figure 5, by using a separate externally screw-threaded member 15 having a driven engagement with the tool shank 9 by means of a tang 16 on the said member engaging a cross-slot 17 in the end of the tool, the screw-threaded member engaging the non-rotatable collar 11.

In the application of the invention to the type of chuck shown in Figure 6, the screw-threaded end of the tool shank 9 co-operates with a tapped hole 18 in the blind end of the socket 13 of the chuck body 2. In this case the tool shank 9 is formed or provided with a fixed collar 19. In this type of chuck the arrangement of the coned surfaces 5a, 6a on the collet 4 and the chuck body is the reverse of that shown in Figures 1 and 5. In the event of any rotational slip taking place between the tool and the collet the tendency for the tool shank to screw further into the tapped hole 18 in the socket 3 causes the said collar 19 to press the coned portion of the collet into closer engagement with the coned part of the chuck body, thereby contracting the collet more firmly about the tool shank 9. At the same time the tendency for the tool to move inwardly counteracts the opposite tendency of the flutes 14 to draw it outwardly.

In the alternative arrangement shown in Figure 7 the inner or unsplit end of the collet 4 is provided with an internal screw-thread 20 and is prevented from rotation relatively to the body 2 of the chuck by means of a pin 12a engaging a longitudinal groove 13a in the collet so that the latter is free to move only in an axial direction. The inner end of the tool shank 9 is, as in the preceding examples, screw-threaded externally but in this case is adapted to engage with the screw-threads 20 in the collet. In use the action of the chuck is the same as previously described, the only difference being one of construction, the collar 11 of the preceding arrangement being in this case formed as an integral part of the collet. Instead of forming the screw thread at the inner end of the tool shank it may, as shown in Figure 8, be formed at an intermediate part in the length of the shank 9 and the split outer end of the collet 4 suitably tapped for engagement therewith.

In another form, shown in Figure 9, axial movement of the collet is produced by means of a stud having right and left-hand screw-threaded ends 21, 22 respectively and an intermediate flange or collar 23. The right-hand threaded end 21 of the stud engages a tapped axial hole in the inner end of the tool shank 9 and the left-hand end 22 engages a tapped hole in the blind end of the socket 3 in the chuck body 2, whilst the flange 23 is adapted to take a bearing against the inner end of the collet 4. In this case rotary movement of the tool shank relatively to the chuck body causes the flange aforesaid to be forced outwardly against the inner end of the collet thereby pressing the coned split portion 5 thereof into more intimate frictional contact with the correspondingly coned portion 6 of the locking sleeve 7 and increasing the frictional grip of the collet about the tool shank 9.

The invention also includes certain modifications of the arrangement shown in Figure 6. According to the modified form of this arrangement shown in Figure 10 the inner end of the collet 4 is provided with an inwardly directed flange 24 and the inner end 25 of the tool shank 9 is reduced in diameter and screw-threaded to engage a tapped hole 26 in the blind end of the socket 3 in the chuck body 2, the shoulder 27 on the tool shank abutting against the under side of the flange 24 on the collet. The arrangement is such that when the tool shank rotates relatively to the chuck body, the co-action of their screw threads draws the shoulder 27 on the tool shank inwardly against the said flange 24 thereby causing the split and coned outer end of the collet 4 to be more closely contracted about the tool shank 9.

Instead of forming the inner end of the tool shank with an integral screw-threaded stem of reduced diameter, it may, as shown in Figure 11, be tapped with an axial hole to receive one end 28 of a stud the other end 29 of which is adapted to screw into a tapped axial hole in the blind end of the socket 3 in the chuck body 2. The action is, however, the same as that immediately above described, rotary motion of the tool shank 9 relatively to the chuck body 2 causing the said stud to draw the inner end of the tool shank inwardly against the underside of the flange 24 on the split collet 4 which is thereby moved axially inwards and contracted more firmly about the shank of the tool 8 by the co-action of the coned surfaces 5a, 6a.

It will be understood that in every case the actual amount of rotation or slip of the tool relatively to the collet or the chuck body sufficient to produce the desired effect is so slight as not to have any adverse effects on the machining operation.

I claim:

1. A rotary chuck for frictionally gripping a tool to cause the tool to rotate with said chuck during operation upon a work-piece, said chuck comprising an arbor formed with a rotating recessed socket member, a locking socket member having a beveled contact surface, said members having screw-thread engagement for operative association, a contractible collet slidably disposed between said socket members and having a similar beveled contact surface to cooperate with the beveled contact surface of said locking socket member to compress the collet, in combination with a rotary tool extending into said collet to be frictionally gripped thereby for rotation therewith, said recessed socket member and said tool being so formed and associated as to limit their relative axial movement toward each other, means actuated by the independent partial rotation of said recessed socket member relative to said tool incident to the slippage of the collet about the tool when the latter is initially subjected to a heavy load for forcing said collet in the direction of its beveled contact surface axially of the tool into progressively tighter contact with the opposed cooperating beveled contact surface of said locking socket member to progressively compress the collet into progressively tighter frictional engagement about said tool until said slippage ceases.

2. In a device of the character described wherein a contractible collet having an external coned surface at one end and an internal screw thread at the other end is slidably mounted in a rotating socket member and adapted to receive the screw threaded stem of a tool rotatable therewith; a locking sleeve in screwed connection with said socket member and having an internal coned surface adapted to co-operate with the coned end of said collet, and means for preventing rotation of said collet relatively to said socket member so that rotational slip of the tool in said collet causes the latter to be contracted about the stem of said tool.

3. A rotary chuck comprising an arbor formed at its free end with an externally screw-threaded recessed socket member having a blind end wall, a split contractible collet having a coned portion and extending in the recess of said member, and a locking socket member having a coned portion cooperating with the coned portion of said collet, and screw-thread engagement between said socket members to cause frictional engagement between said coned portions and to compress said collet, in combination with a tool having an end portion abutting said blind end wall and received by said collet and gripped thereby to turn therewith when said socket members have been relatively rotated to compress said collet by the cooperative engagement of said coned portions, means associated with said tool and collet and actuated by the partial rotation of said collet about said tool during the initial rotational slip of said collet about said tool incident to the initial subjecting of said tool to a heavy load to force said collet with its coned portion in the direction of the latter into tighter contact with the cooperating coned portion of said locking socket member to thereby progressively further compress the collet to grip said tool with progressively increasing friction until such slip ceases.

4. A rotary chuck for frictionally gripping a tool to cause the tool to rotate with said chuck during operation upon a work-piece, said chuck comprising an arbor formed with a recessed socket member having a blind end wall, a contractible collet having a cone surface, and a locking socket member having a coned surface to cooperate with the coned surface of said collet in contracting or compressing said collet, said socket members having screw-thread engagement with each other whereby their relative rotation during such engagement will cause their relative axial movement, in combination with a nut disposed in the recess of said recessed socket member substantially concentric with said collet, means associated with said nut and said recessed socket member for preventing relative rotation between said nut and said recessed socket member while permitting relative axial movement therebetween, and a tool having a portion extending axially through said collet and said nut to engage said blind end wall, that part of said portion extending through said nut being externally screw-threaded and engaging the thread of said nut to cause relative axial movement between said portion and said nut upon relative rotary movement between said tool and nut, said nut extending radially outwardly sufficiently to engage with its adjacent end face the cooperating adjacent end face of said collet, and the cooperating threads of said tool and said nut being so formed that said nut in turning about said tool with said socket incident to initial slippage between said tool and said collet as said tool is initially subjected to a heavy load will move axially of the tool against the adjacent cooperating end face of said collet and will force the latter with its coned surface axially of the chuck members into progressively tighter contact with the coned surface of the locking socket member to progressively compress the collet into progressively tighter frictional contact with that portion of the tool disposed therein until said slippage ceases.

FRANK HENRY CLARKSON.